(12) United States Patent
Teranishi et al.

(10) Patent No.: US 11,579,792 B2
(45) Date of Patent: Feb. 14, 2023

(54) DATA MOVEMENT BETWEEN DIFFERENT CELL REGIONS IN NON-VOLATILE MEMORY

(71) Applicant: KIOXIA CORPORATION, Tokyo (JP)

(72) Inventors: Masaomi Teranishi, Yokohama Kanagawa (JP); Kentaro Inomata, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/187,710

(22) Filed: Feb. 26, 2021

(65) Prior Publication Data

US 2022/0050615 A1  Feb. 17, 2022

(30) Foreign Application Priority Data

Aug. 12, 2020 (JP) .............................. JP2020-136452

(51) Int. Cl.
*G06F 3/06* (2006.01)
*G06F 12/122* (2016.01)
*G06F 12/123* (2016.01)
*G06F 12/1027* (2016.01)

(52) U.S. Cl.
CPC .......... *G06F 3/0647* (2013.01); *G06F 3/0604* (2013.01); *G06F 3/0679* (2013.01); *G06F 12/1027* (2013.01); *G06F 12/122* (2013.01); *G06F 12/124* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 9,959,209 B1 * | 5/2018 | Burton | G06F 11/3055 |
| 10,275,172 B2 * | 4/2019 | Pahwa | G11C 16/30 |
| 2011/0314204 A1 | 12/2011 | Ootsuka et al. | |
| 2012/0030428 A1 * | 2/2012 | Yasufuku | G06F 12/0804 |
| | | | 711/E12.052 |
| 2012/0072801 A1 | 3/2012 | Takeuchi et al. | |
| 2013/0265825 A1 * | 10/2013 | Lassa | G06F 3/0655 |
| | | | 365/185.11 |
| 2018/0032275 A1 * | 2/2018 | Pahwa | G11C 16/20 |
| 2018/0321874 A1 * | 11/2018 | Li | G06F 11/1004 |
| 2019/0095116 A1 | 3/2019 | Igahara et al. | |
| 2019/0102083 A1 * | 4/2019 | Dusija | G06F 3/0679 |
| 2019/0220218 A1 * | 7/2019 | Deshe | G06F 3/0685 |
| 2019/0377681 A1 * | 12/2019 | Hodes | G06F 12/0871 |
| 2020/0118636 A1 * | 4/2020 | Athreya | G11C 16/08 |

* cited by examiner

*Primary Examiner* — William E. Baughman
(74) *Attorney, Agent, or Firm* — Kim & Stewart LLP

(57) ABSTRACT

According to one embodiment, a memory system includes a non-volatile memory array with a plurality of memory cells. Each memory cell is a multilevel cell to which multibit data can be written. The non-volatile memory array includes a first storage region in which the multibit data of a first bit level is written and a second storage region in which data of a second bit level less than the first bit level is written. A memory controller is configured to move pieces of data from the first storage region to the second storage region based on the number of data read requests for the pieces of data received over a period of time or on external information received from a host device that sends read requests.

6 Claims, 8 Drawing Sheets

FIG. 4

| ADDRESS | THE NUMBER OF READ REQUESTS |
|---|---|
| ⋮ | ⋮ |
| ADDaaa | 717 |
| ⋮ | ⋮ |
| ADDbbb | 214 |
|  |  |
|  |  |
| ADDccc | 5 |
| ⋮ | ⋮ |
| ADDddd | (214) |
|  |  |
| ADDeee | 85 |
| ⋮ | ⋮ | pSLC: ADDaaa ... ADDbbb
QLC: ADDccc ... ADDeee
MA: ADDbbb ... ADDddd
TBL

FIG. 5

START → S1: READ REQUEST FROM HOST? — NO loops back; YES → S2: MANAGE THE NUMBER OF TIMES LBA IS READ → END

| | ADDRESS | THE NUMBER OF CACHE HITS | THE NUMBER OF CACHE MISSES | |
|---|---|---|---|---|
| pSLC | ⋮ | ⋮ | ⋮ | TBL1 |
| | ADDaaa | 717 | 0 | |
| | ⋮ | ⋮ | ⋮ | |
| | ADDbbb | 0 | 15 | |
| QLC | ⋮ | ⋮ | ⋮ | MA |
| | ADDccc | 5 | 5 | |
| | ⋮ | ⋮ | ⋮ | |
| | ADDddd | 214 | 5 | |
| | ⋮ | ⋮ | ⋮ | |
| | ADDeee | 20 | 3 | |
| | ⋮ | ⋮ | ⋮ | |

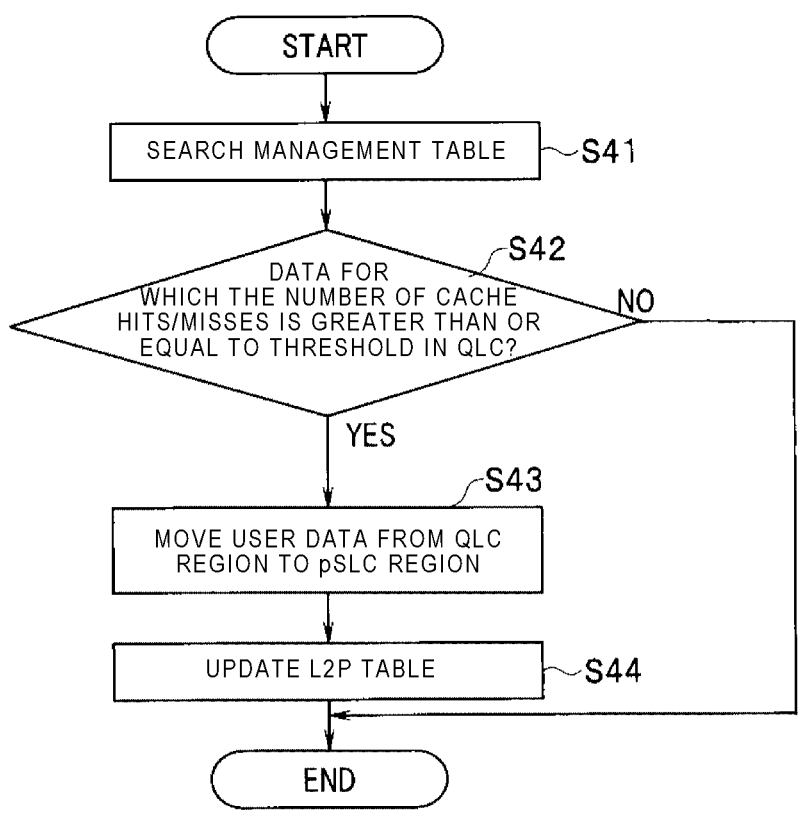

DATA MOVEMENT BETWEEN DIFFERENT CELL REGIONS IN NON-VOLATILE MEMORY

CROSS-REFERENCE TO RELATED APPLICATION

This application is based upon and claims the benefit of priority from Japanese Patent Application No. 2020-136452, filed Aug. 12, 2020, the entire contents of which are incorporated herein by reference.

FIELD

Embodiments described herein relate generally to a memory system.

BACKGROUND

In order to increase memory capacity, a multilevel storage technique can be used in a memory system. When the multilevel storage technique is used, the number of bits of data that can be recorded in each memory cell increases, however, a reading speed of the stored data and a writing speed for recording the data in the memory system are likely to be slower.

BRIEF DESCRIPTION OF THE DRAWINGS

FIG. 4 depicts a management table for tracking the number of times user data is read in a first embodiment.

FIG. 5 is a flowchart of update processing of a management table according to a first embodiment.

FIG. 11 is a flowchart of user data movement processing according to a third embodiment.

DETAILED DESCRIPTION

Embodiments provide a memory system that moves data whose reading frequency is high to a high-speed readable storage region.

In general, according to one embodiment, a memory system, includes a non-volatile memory array having a plurality of memory cells. Each memory cell is a multilevel cell to which multibit data can be written. The non-volatile memory array includes a first storage region in which the multibit data of a first bit level is written and a second storage region in which data of a second bit level less than the first bit level is written. A memory controller is configured to move pieces of data from the first storage region to the second storage region based on the number of data read requests for the pieces of data received over a period of time or on external information received from a host device or the like.

Hereinafter, certain example embodiments will be described with reference to the drawings.

First Embodiment

Figure 1:
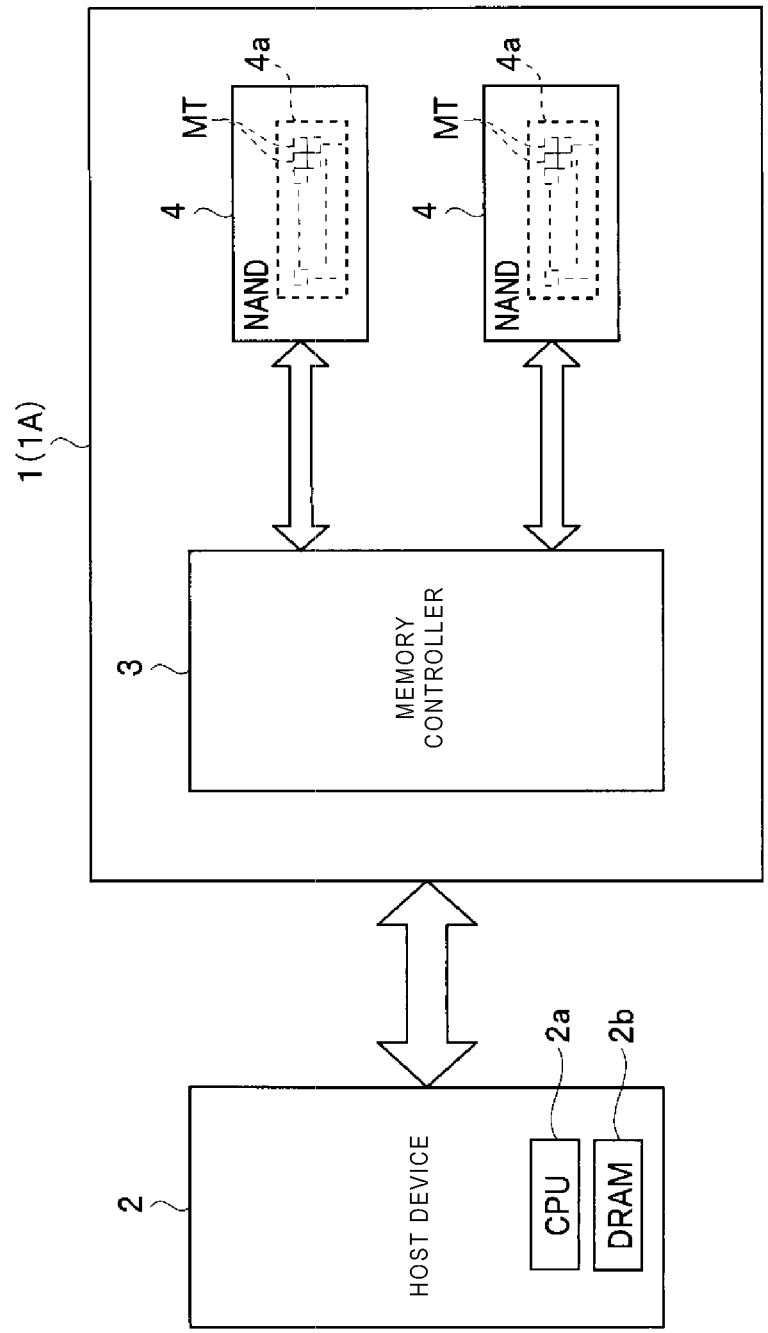
FIG. 1 is a block diagram showing a configuration of a memory system according to a first embodiment.

FIG. 1 is a block diagram showing a configuration of a memory system according to the first embodiment. A memory system 1 can be connected to a host device 2 ("host 2"). FIG. 1 shows the memory system 1 connected to the host 2.

The host 2 is, for example, a personal computer, a smartphone, or the like. The host 2 includes a central processing unit (CPU) 2a as a processor, an ROM, and a DRAM 2b.

The memory system 1 includes a memory controller 3 and a plurality of NAND flash memories 4 ("NAND memories 4"). In the present example two NAND memories 4 are depicted.

Each NAND memory 4 is a semiconductor storage device including a memory cell array 4a and a control circuit (not separately depicted). The memory cell array 4a includes a plurality of memory cells MT. N-bit data can be written into each memory cell MT, where here N is an integer of 2 or more. The memory cell MT is thus a multilevel cell such as a triple-level cell (TLC) capable of storing 3-bit data or a quad-level cell (QLC) capable of storing 4-bit data. Here, an example in which the memory cell MT is a QLC memory cell will be described.

In response to a request from the host 2, the memory system 1 stores user data ("data") received from the host 2 in each NAND memory 4 or reads the data previously stored in the NAND memories 4 and outputs the read data to the host 2. Specifically, the memory system 1 writes the data into each NAND memory 4 as a page unit in response to a write request from the host 2, and reads the data from each NAND memory 4 in response to a read request from the host 2.

Here, the memory system 1 includes the plurality of NAND memories 4, however, in certain examples, the memory system might include only one NAND memory 4. The memory system 1 may be a memory card in which the memory controller 3 and the plurality of NAND memories 4 are integrated as one package, or may be a solid-state drive (SSD).

Figure 2:
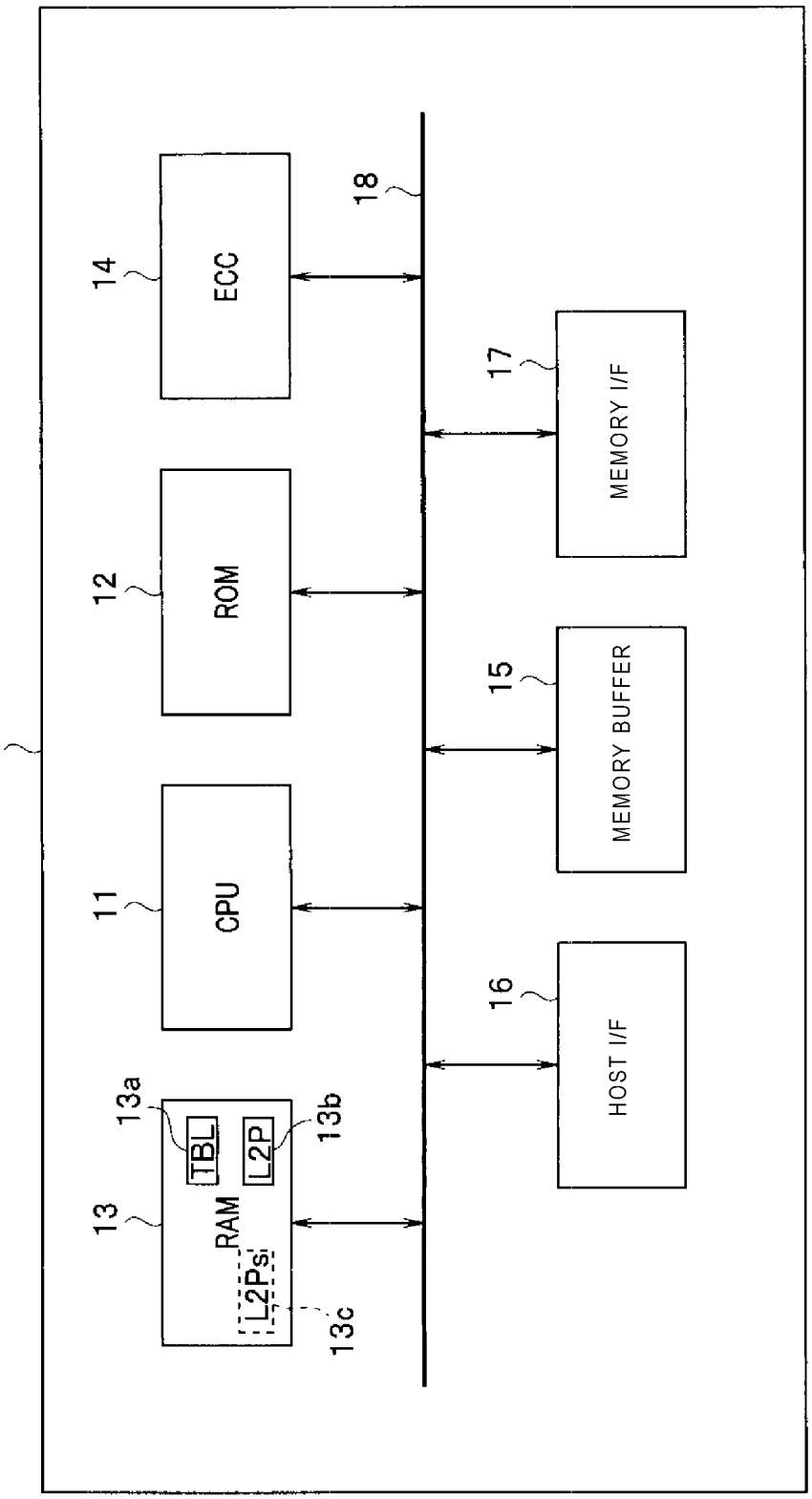
FIG. 2 is a block diagram showing a configuration of a memory controller according to a first embodiment.

FIG. 2 is a block diagram showing a configuration of the memory controller 3. The memory controller 3 controls writing and reading of the data into and from each NAND memory 4. The memory controller 3 controls the writing of the data into a NAND memory 4 in response to the write request from the host 2. Specifically, the memory controller 3 writes the data into each NAND memory 4 in a page unit of a predetermined size. Furthermore, the memory controller 3 controls the reading of the data from each NAND memory 4 in response to the read request from the host 2.

The memory controller 3 includes a central processing unit (CPU) 11 as a processor, an ROM 12, an RAM 13, an error detection and correction (ECC) circuit 14, a memory buffer 15, a host interface circuit 16 ("host I/F 16"), and a memory interface circuit 17 ("memory I/F 17"). The CPU 11, the ROM 12, the RAM 13, the ECC circuit 14, the memory buffer 15, the host I/F 16, and the memory I/F 17 are connected to each other by an internal bus 18.

The CPU 11 controls each sub-unit of the memory system 1 by executing one or more programs stored in the ROM 12. When the CPU 11 receives a request from the host 2 via the host I/F 16, the CPU 11 performs various controls by executing the program(s) according to the request. For example, the CPU 11 instructs the memory I/F 17 to write the data into each NAND memory 4 according to the request from the host 2. Furthermore, the CPU 11 instructs the memory I/F 17 to read the data from each NAND memory 4 according to a request from the host 2.

When the CPU 11 receives a write request from the host 2, the CPU 11 selects a storage region on one or more NAND memory 4 for the user data (corresponding to the write request) that has been stored in the memory buffer 15. That is, the CPU 11 manages a write destination of the user data. A correspondence between a logical block address LBA of the user data received from the host 2 and a physical block address PBA indicating the storage region on a NAND memory 4 at which the user data is stored can be determined based on a logical-to-physical address conversion table. The logical-to-physical address conversion table can be referred to as a logical-to-physical table or more simply as a L2P table. The L2P table stores data in which the logical block address LBA used when the host 2 accesses the memory system 1 and the physical block address PBA in the memory system 1 have a one-to-one correspondence.

Further, when the CPU 11 receives the data read request from the host 2, the CPU 11 refers to the L2P table for the logical block address LBA specified by the read request, and thus identifies the corresponding physical block address PBA, and then instructs the memory I/F 17 to read the data from the physical block address PBA. That is, when the CPU 11 receives the request from the host 2, the CPU 11 identifies the physical block address corresponding to the logical block address LBA related to the request, and then performs the writing and the reading of the data accordingly.

The ROM 12 stores various programs and various types of data. The RAM 13 temporarily stores the various types of data and the like. A number-of-times management table and the L2P table are stored in the RAM 13. The number-of-times management table TBL ("management table TBL") is for tracking the number of times data has been read. The management table TBL is stored in a storage region 13*a* of the RAM 13. The L2P table is stored in a storage region 13*b* of the RAM 13.

The ECC circuit 14 encodes the user data to be written and subsequently decodes the user data as read from each NAND memory 4.

The memory buffer 15 temporarily stores the user data received from the host 2. Furthermore, the memory buffer 15 temporarily stores the user data that has been read from a NAND memory 4. The memory buffer 15 is, for example, a general-purpose memory such as a static random access memory (SRAM) or a dynamic random access memory (DRAM).

The host I/F 16 performs processing according to a predetermined interface standard with the host 2. The host I/F 16 outputs the requests and the user data received from the host 2 to the internal bus 18, and transmits the user data that has been read from a NAND memory 4 and a response to a request from the CPU 11 and the like to the host 2.

Under the control of the CPU 11, the memory I/F 17 performs processing related to the writing of the data into each NAND memory 4 and the reading of the data from the NAND memories 4.

Figure 3:
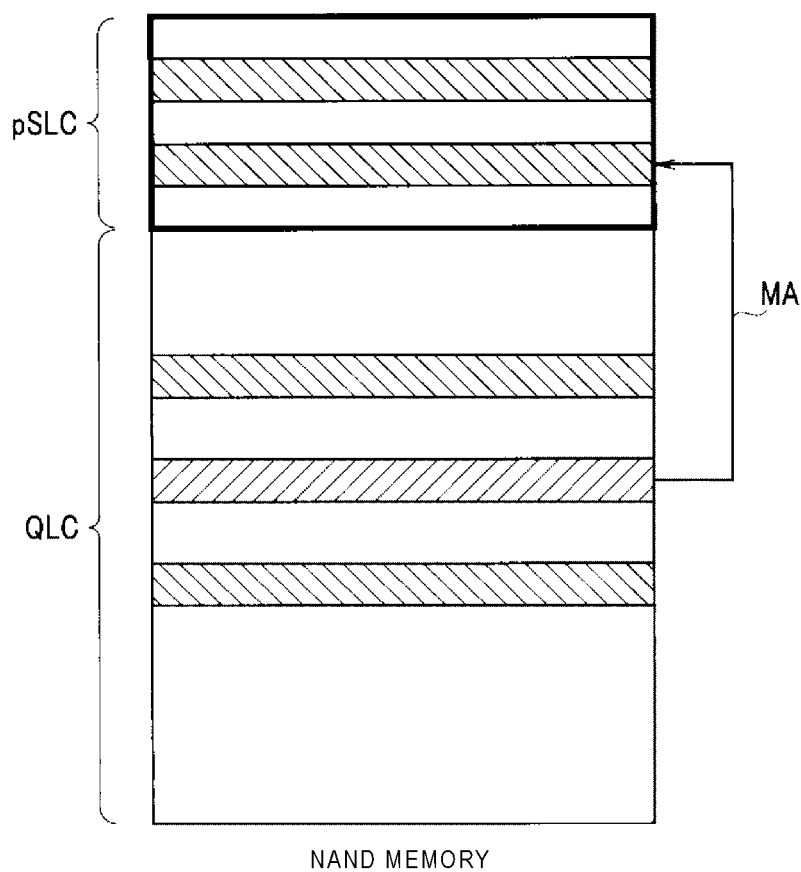
FIG. 3 shows a memory map of a NAND memory according to a first embodiment.

FIG. 3 shows a memory map of each NAND memory 4. As described above, the NAND memory 4 can store 4-bit data in each memory cell MT. An arrow MA indicates that the user data is moved from a QLC region to an address in another region (a pseudo single level cell (pSLC) region).

A data storage region in each NAND memory 4 has a pseudo single level cell (pSLC)) region and a QLC region. The pSLC region and the QLC region in the data storage region of each NAND memory 4 are set in advance in this example. The memory controller 3 can write the user data into the pSLC region or the QLC region. The memory controller 3 can also read the user data from the pSLC region and the QLC region based on the logical block address LBA related to the request from the host 2.

The pSLC region is a storage region in which 1-bit data is written into a pseudo single level cell (pSLC). In each of the pseudo single level cells (pSLCs), 4-bit data could be written, but only 1-bit data is written. The writing of the data into the pSLC region is specified by a command from the memory controller 3. Therefore, the memory system. 1 includes a recording mode (pSLC mode) in which 1-bit data is written in the memory cells MT in the pSLC region, and another recording mode in which 4-bit data is written in the memory cells MT in the QLC region. The writing time of data into the pSLC region is shorter than the writing time of the same data into the QLC region. Furthermore, the reading time of data stored in the pSLC region is shorter than a reading time of data stored in the QLC region.

When the memory controller 3 receives a write request of user data from the host 2, the memory controller 3 refers to (that is, searches) the L2P table and identifies the physical block address PBA corresponding to the logical block address LBA related to the request. The memory controller 3 writes the user data into the storage region at the identified physical block address PBA.

When the memory controller 3 receives a read request for user data from the host 2, the memory controller 3 refers to (that is, searches) the L2P table and identifies the physical block address PBA corresponding to the logical block address LBA related to the request. The memory controller 3 reads the user data from the storage region at the identified physical block address PBA.

As described above, each memory cell MT in the pSLC region is a memory region in which 1-bit data is written. Each memory cell MT in the pSLC region could store 4-bit data (that is, memory cells MT in the pSLC region have the same structure as the memory cells MT in the QLC region), but is used only to store 1-bit data. Therefore, the pSLC region generally has a faster writing speed and a faster reading speed than the QLC region. The memory controller 3 writes user data into the pSLC region in the recording mode by which 1-bit data is written.

Various types of parameter data, various programs, and the like can be stored in the pSLC region. When power is turned on, the various parameter data and the like is read from the pSLC region into the memory controller 3 and stored in the RAM 13. The various types of parameter data and the like of the RAM 13 are used during operations of the memory system 1. The various types of parameter data and the like may be updated from time to time. When the power is turned off, the memory controller 3 writes the various parameter data and the like from the RAM 13 into the pSLC region of one or more NAND memory 4.

Each memory cell MT in the QLC region is a memory region in which 4-bit data is written. The memory controller 3 writes the user data in the QLC region in the recording mode in which 4-bit data is written.

In the first embodiment, the user data whose reading frequency is high can be stored in the pSLC region. When the memory controller 3 receives a read request of the user data from the host 2, the memory controller 3 counts (tracks) the number of the read requests received for each logical block address LBA over time.

FIG. 4 shows a configuration of the management table TBL for tracking, by logical block address LBA, the number of times user data is read. The management table TBL includes addresses of the logical block address LBA and information on the number of times the logical block address has been read previously. The addresses in this example are head addresses of the logical block address LBA. The management table TBL stores the information on the number of times of the reading for each address. That is, the management table TBL stores information about the number of times data has been read from the logical block address LBA included in the read request from the host 2.

In FIG. 4, in order to facilitate understanding, logical block addresses of the pSLC region are collectively shown on an upper portion of the number-of-times management table TBL, and logical block addresses of the QLC region are collectively shown below the pSLC region. Such discrete grouping is not necessarily required.

Next, an operation of the memory controller 3 will be described.

When the memory controller 3 receives the read request from the host 2, the memory controller 3 executes reading processing of the user data, and executes management processing of the number of the read requests as background processing of the reading processing. Here, the number of the read requests for each address is managed. When the CPU 11 receives the read request from the host 2, the CPU 11 executes update processing of the management table TBL.

FIG. 5 is a flowchart showing an example of a flow of the update processing of the management table TBL. The processing in FIG. 5 is performed by the CPU 11 reading the programs stored in the ROM 12 of the memory controller 3, loading the programs into the RAM 13, and executing the programs.

The CPU 11 determines whether a read request from the host 2 has been received (S1). When the read request is not received (S1; NO), the CPU 11 does not perform the update processing of the management table TBL.

When the read request from the host 2 is received (S1; YES), the CPU 11 manages the number of the read requests of the logical block address LBA (S2). In S2, the update processing of the number of the read requests data of the logical block address LBA included in the read request in the management table TBL is performed. That is, when the memory controller 3 receives the read request from an external device (host 2), the memory controller 3 increments the number of the read requests of the logical address (LBA) of the user data related to the read request.

That is, the memory controller 3 updates the number of the read requests of the address (logical block address LBA) of the user data every time the read request is received from the host 2. As a result, the number of the read requests data for each address of the user data is stored in the management table TBL.

Figure 6:
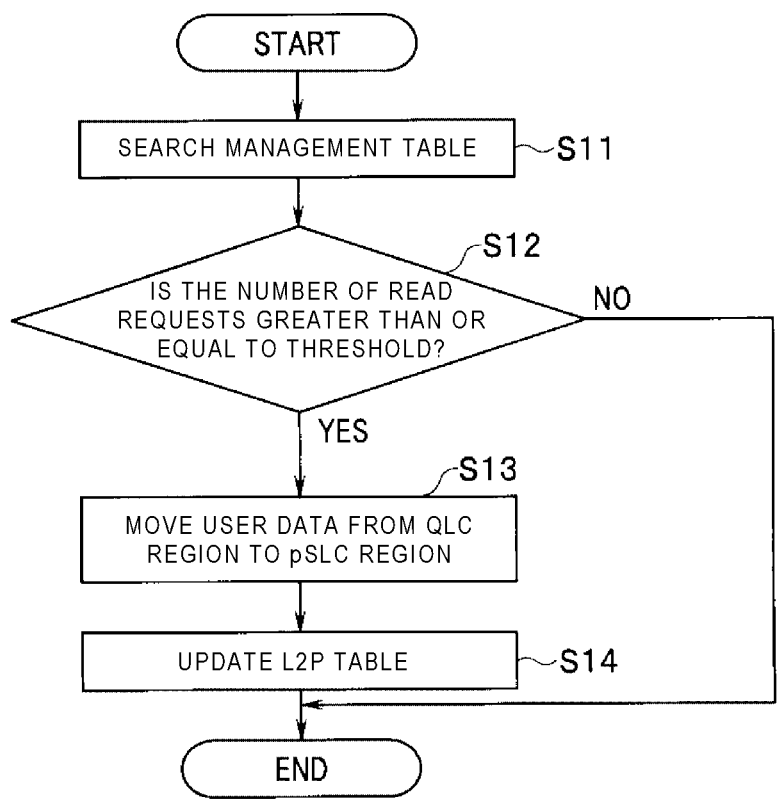
FIG. 6 is a flowchart of user data movement processing according to a first embodiment.

FIG. 6 is a flowchart showing an example of a flow of user data movement processing. The processing of FIG. 6 may be executed when the processing of the read request from the host 2 is executed, or may be executed when predetermined processing other than the read request processing such as garbage collection processing and compaction processing is executed, or may be executed at a predetermined cycle.

The CPU 11 searches the management table TBL (S11), and determines whether there is a logical block address LBA in which the number of the read requests is greater than or equal to a predetermined threshold TH in the logical block address LBA of the user data stored in the QLC region (S12). That is, the CPU 11 reads the number of the read requests in the management table TBL for the user data stored in the QLC region, and determines whether there is a logical block address LBA for which the number of the read requests is greater than or equal to the predetermined threshold TH.

When there is no logical block address LBA for which the number of the read requests is greater than or equal to the predetermined threshold TH in the QLC region (S12; NO), the CPU 11 does not perform the user data movement processing.

When there is a logical block address LBA for which the number of the read requests is greater than or equal to the predetermined threshold TH in the QLC region (S12; YES), the CPU 11 moves the user data corresponding to the logical block address LBA for which the number of the read requests is greater than or equal to the predetermined threshold TH from the QLC region to the pSLC region (S13). That is, when the number of the read requests is greater than or equal to the predetermined threshold TH, the memory controller 3 performs the movement processing on the user data whose number of the read requests is greater than or equal to the predetermined threshold TH.

After moving the user data, the CPU 11 updates the L2P table to reflect the movement (S14). That is, in order to change the physical block address PBA of the user data corresponding to the moved logical block address LBA, the memory controller 3 updates an address conversion table (L2P table) of the NAND memory 4 after performing the movement processing on the data.

When the processing shown in FIG. 6 is executed every time there is the read request from the host 2, in S13, the movement processing is performed on one user data corresponding to one logical block address LBA. However, when the garbage collection processing is performed, when the processing shown in FIG. 6 is executed, in S13, the movement processing may be performed on a plurality of user data corresponding to a plurality of logical block addresses LBAs.

As described above, the memory controller 3 performs the movement processing on the data based on information about the number of the data read requests from a first storage region (QLC region) of the NAND memory 4 in which the data is written in a data format of n-bit data to a second storage region (pSLC region) in which the data is written to the NAND memory 4 in a data format of bit data with the number of bits smaller than n-bit.

Then, the information on the number of the read requests is the number of the read requests received by the memory controller 3 from the device (host 2) that outputs the data read requests. The number of the read requests is counted for each logical address (LBA) of request data related to the read request.

Figure 7:
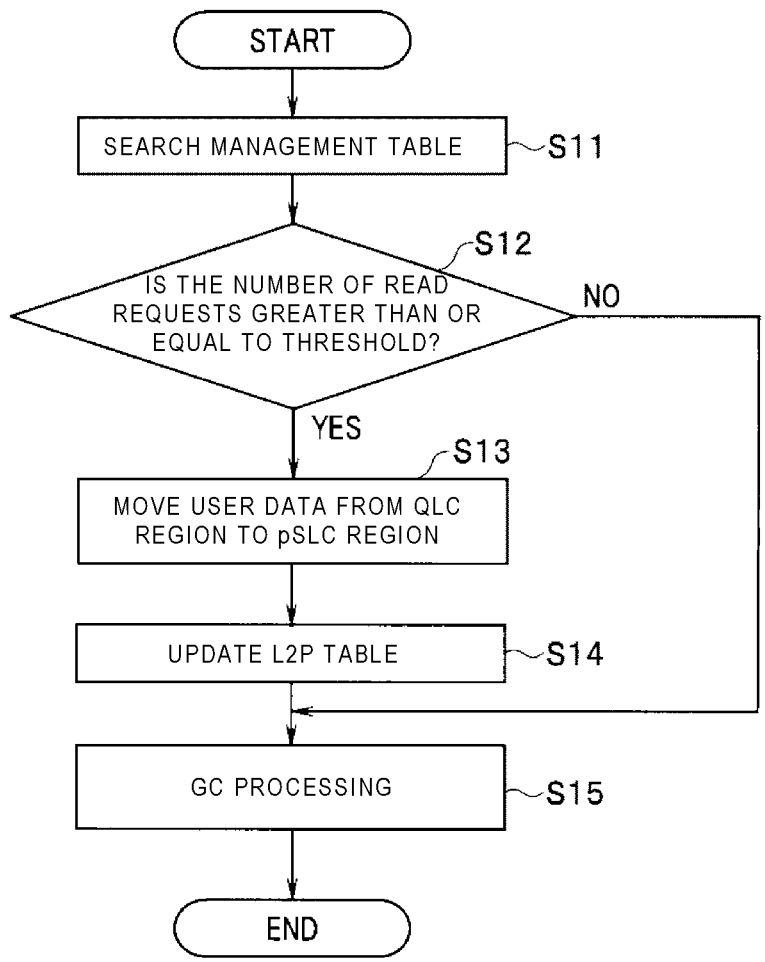
FIG. 7 is a flowchart of user data movement processing when garbage collection processing is performed according to a first embodiment.

FIG. 7 is a flowchart showing an example of a flow of user data movement processing when the garbage collection processing is performed. The processing of FIG. 7 is executed when processing of the garbage collection processing is initiated. In FIG. 7, the same processing steps as the processing steps of FIG. 6 are assigned the same step numbers and only processing different from the processing of FIG. 6 will be described.

The CPU 11 searches the management table TBL (S11), and determines whether there is a logical block address LBA in which the number of the read requests is greater than or equal to the predetermined threshold TH in the logical block address LBA of the QLC region (S12). When there is no data whose number of the read requests is greater than or equal to the predetermined threshold TH in the logical block address LBA of the QLC region (S12; NO), the CPU 11 executes the standard garbage collection processing (GC processing) (S15).

When there is the logical block address LBA in which the number of the read requests is greater than or equal to the predetermined threshold TH in the logical block address LBA of the QLC region (S12: YES), the CPU 11 executes processing of moving the user data corresponding to the logical block address LBA in which the number of the read requests is greater than or equal to the predetermined threshold TH from the QLC region to the pSLC region (S13), and updates the L2P table (S14). After S14, the CPU 11 executes the GC processing (S15).

Refer to FIG. 4 again. FIG. 4 shows that since the number of the user data read requests at an address ADDddd is greater than or equal to 200 when the predetermined threshold TH is 200, as indicated by the arrow MA, the user data at the address ADDddd is moved from the QLC region to an address ADDbbb in the pSLC region.

As described above, in the memory system 1, the number of the read requests for each data is tracked in a management table, and the memory system. 1 autonomously moves the user data for which the number of the read requests is large from the QLC region (which is a memory region having a slow reading speed) to the pSLC region having a high reading speed. Accordingly, the reading speed for data that is accessed often is improved.

According to the above-described embodiment, since the data whose reading frequency is high is stored in the pSLC region in a NAND memory 4, the memory system 1 can read the data whose reading frequency is high at a higher speed.

Data with a low reading frequency, even if previously moved to pSLC region as data having a high reading frequency, may be moved from the pSLC region to the QLC region by using a least recently used (LRU) algorithm or a least frequently used (LFU) algorithm. That is, after data is moved into the pSLC region, the memory controller 3 may subsequently perform move data for which the number of the read requests is less than some predetermined threshold value from the pSLC region to the QLC region.

Second Embodiment

The first embodiment describes a case in which the memory controller 3 performs the movement processing on the data from the QLC region to the pSLC region based on the number of the read requests from the host 2. In the second embodiment, the memory controller 3 performs movement processing on data from a QLC region to a pSLC region based on information from the host 2.

Since a hardware configuration of a memory system 1A of the second embodiment is substantially the same as the configuration of the memory system 1 of the first embodiment shown in FIGS. 1 and 2, the same reference numerals are used for the same components, and only different aspects will be described.

The memory system 1A according to the second embodiment is a system conforming to a universal flash storage (UFS) standard, and has a host performance booster (HPB) function of the UFS standard. The HPB function is a standard function for flash storage devices.

Since the memory controller 3 of the memory system 1A has the HPB function, a part of an L2P table can be transmitted to the host 2 according to a request from the host 2. An L2Ps table that is a part of the L2P table is cached in the DRAM 2b on the host 2. As targets of the L2Ps table cached in the DRAM 2b, the host 2 can set data of "pinned region" set by the host 2 and data (active region) which is read many times of a logical block address LBA recorded when the host 2 is started in the past. The host 2 can request the set data of "pinned region" to the memory system 1A and acquire the data as the L2Ps table. The L2Ps table includes a logical block address LBA and a physical block address PBA for the set data.

When accessing user data included in the L2Ps table, the host 2 also transmits the L2Ps table together to the memory system 1A. That is, the memory system 1A may also receive the L2Ps table together when receiving a read request. The CPU 11 of the memory controller 3 stores the L2Ps table received from the host 2 in a storage region 13c (indicated by a dotted line in FIG. 2) of the RAM 13.

The CPU 11 moves the user data from the QLC region to the pSLC region based on the L2Ps table. That is, the CPU 11 moves the user data corresponding to the logical block address LBA included in the L2Ps table from the QLC region to the pSLC region. Further, the CPU 11 also updates the L2P table based on the physical block address PBA of a movement destination for the logical block address LBA.

Figure 8:
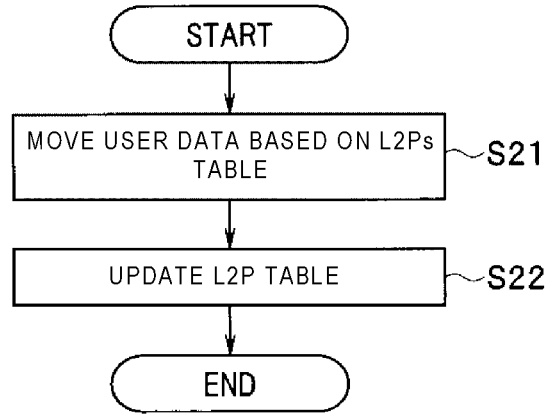
FIG. 8 is a flowchart of data movement processing according to a second embodiment.

FIG. 8 is a flowchart showing an example of a flow of data movement processing in the present embodiment. When the L2Ps table from the host 2 is received, the processing of FIG. 8 is executed by the CPU 11.

The CPU 11 stores the L2Ps table in the storage region 13c, executes the processing of moving the user data from the QLC region to the pSLC region based on the L2Ps table (S21), and updates the L2P table in the storage region 13b (S22).

In S21, the user data having a high reading frequency and set by the host 2 is moved from the QLC region to the pSLC region.

A logical block address LBA of the data of "pinned region" set by the host 2 and a logical block address LBA of the data (active region) which is read many times of the logical block address LBA recorded when the host 2 is started in the past are included in the L2Ps table. Therefore, by moving the user data from the QLC region to the pSLC region based on the L2Ps table, the memory system 1A can read these data at a high speed.

Therefore, according to the memory system 1A of the present embodiment, among the data stored in each NAND memory 4, the data having a high reading frequency can be read from the pSLC region at a high speed.

Even in a case of the user data moved to the pSLC region based on information from the host 2, data whose reading frequency is low may be moved from the pSLC region to the QLC region by using a least recently used (LRU) algorithm or a least frequently used (LFU) algorithm.

Third Embodiment

In the above-described embodiments, the user data with a large number of the read requests is moved from the QLC region to the pSLC region. In the third embodiment, in addition to the processing of the first or the second embodiment, after moving the data from a QLC region to a pSLC region based on an L2Ps table, the memory controller 3 tracks the number of cache hits and the number of cache misses for each piece of data in subsequent reading using data in the pSLC region as cache data. In this case, the memory controller 3 performs movement processing on the data according to the number of cache hits and the number of cache misses for each logical block address LBA.

Figures 9, 10:
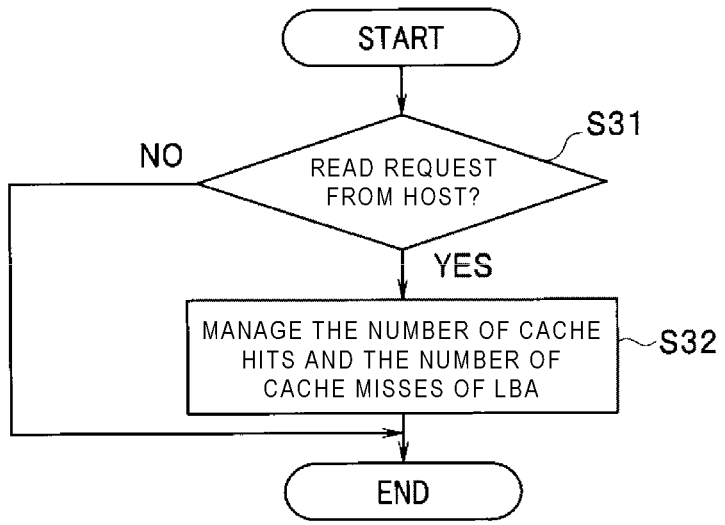
FIG. 9 shows a configuration of a management table for tracking the number of cache hits and the number of cache misses when reading user data according to a third embodiment.
FIG. 10 is a flowchart of update processing of a management table according to a third embodiment.

FIG. 9 shows a configuration of a management table TBL1 for managing the number of cache hits and the number of cache misses when reading the user data in the third embodiment. The management table TBL1 includes the address of the logical block address LBA included in the L2Ps table, and information on the number of cache hits and the number of cache misses. The management table TBL1 is stored in the storage region 13a of the RAM 13 in FIG. 2, for example.

Immediately after the memory system 1A is started and the L2Ps table data is transmitted to the host 2, the address of the pSLC region in the management table TBL1 matches the logical block address LBA in the L2Ps table transmitted to the host 2. However, when a cache miss occurs, a logical block address of the QLC region related to the cache miss is also added to the management table TBL1. Therefore, the management table TBL1 in FIG. 9 may also include the data for the QLC region or portions thereof.

FIG. 10 is a flowchart showing an example of a flow of update processing of the management table TBL1. The processing in FIG. 10 is performed by the CPU 11 reading a program(s) stored in the ROM 12 of the memory controller 3, loading the program(s) into the RAM 13, and executing the program(s).

The CPU 11 determines whether a read request from the host 2 is received (S31). When the read request is not received (S31; NO), the CPU 11 does not perform the update processing of the management table TBL1.

When the read request is received (S31; YES), the CPU 11 tracks the number of cache hits and the number of cache misses for the address (logical block address LBA) of the pSLC region in the management table TBL1 (S32). In S32, based on the logical block address LBA related to the read request, update processing of the number of cache hits and the number of cache misses of the data in the pSLC region in the management table TBL1, that is, increment processing of the number of cache hits and the number of cache misses is performed.

When there is the read request for the data of the logical block address LBA in the pSLC region, it is determined that there is a cache hit. When there is the read request for the data of the logical block address LBA that is not in the pSLC region, it is determined that there is a cache miss. When there is the cache miss, the CPU 11 adds the logical block address LBA of the data related to the cache miss to the management table TBL1.

The memory controller 3 updates the number of cache hits and the number of cache misses of the address (logical block address LBA) of the user data every time the read request from the host 2 is received.

FIG. 11 is a flowchart showing an example of a flow of user data movement processing in the third embodiment.

The processing of FIG. 11 may be executed when the read request from the host 2 is received, or may be executed when predetermined processing other than the read request processing, such as garbage collection processing and compaction processing, is executed, or may be executed at a predetermined cycle (e.g., periodically at fixed intervals of time or the like).

The CPU 11 searches the management table TBL1 (S41) and determines whether there is data in which the number of cache hits and the number of cache misses are greater than or equal to a threshold TH1 (S42). In S42, it is determined whether there is data in which the number of cache hits is greater than or equal to the predetermined threshold TH1 and whether there is data in which the number of cache misses is greater than or equal to the predetermined threshold TH1. That is, the CPU 11 sequentially reads each data of the number of cache hits and the number of cache misses of the management table TBL1 in order, and determines whether there is the data in which the number of cache hits and the number of cache misses are greater than or equal to the predetermined threshold TH1.

In this example, whether the number of cache hits or the number of cache misses are large is determined based on the same threshold TH1. However, in other examples, a threshold value for determining whether the number of cache hits is large may be different from a threshold value for determining whether the number of cache misses is large.

Immediately after the operation of the memory system 1A, the data determined to have a high reading frequency from the host 2 is in the pSLC region. In a subsequent reading of data, the user data that is not initially in the pSLC region is also moved to the pSLC region when the number of cache hits or the number of cache misses increases. FIG. 9 shows that the data in the QLC region is moved to the pSLC region as indicated by the arrow MA.

When there is no data having the large number of cache hits or the large number of cache misses (S42: NO), the CPU 11 does not perform the user data movement processing.

When there is the data in which the number of cache hits or the number of cache misses is greater than or equal to the threshold TH1 in the QLC region (S42; YES), the CPU 11 moves the user data corresponding to the logical block address LBA for which the number is greater than or equal to the predetermined threshold TH1 from the QLC region to the pSLC region (S43).

After moving the user data, the CPU 11 updates the L2P table to the reflect movement of the user data (S44). That is, the physical block address PBA of the moved user data is changed in the L2P table.

As described above, the memory controller 3 performs the movement processing on the data based on external information (the L2Ps table) received from an outside (host 2). The memory controller 3, for example, moves data from a first storage region (e.g., a QLC region) of the NAND memory 4 where the data was written as multilevel data of a n-bit format to a second storage region (e.g., pSLC region) where the data is written into the NAND memory 4 as less than n-bit format data. In some examples, the second storage region may also be written with multilevel data, though of a lower n-bit number than the first storage region.

Further, the external information (the L2Ps table) is information of an external device (host 2) that transmits the read request. In the example described above, the external information (L2Ps table) is information indicate a part or subset of the address conversion table (L2P table) used for converting the logical address (LBA) of the data into the physical address (PBA) of the NAND memory 4.

When the data moved to the pSLC region is used as the cache data based on the external information (the L2Ps table), the memory controller 3 counts the number of cache hits and the number of cache misses of the cache data in response to the read request, and performs the movement processing on the data between the QLC region and the pSLC region based on at least one of the number of cache hits or the number of cache misses.

When the processing shown in FIG. 11 is executed every time there is the read request from the host 2, in S43, the movement processing can be performed on user data corresponding to one logical block address LBA. However, when the processing shown in FIG. 11 is executed when the garbage collection processing is performed, in S43, the movement processing may be performed on a plurality of user data corresponding to a plurality of logical block addresses LBAs.

Therefore, according to the present embodiment, by using the information (L2Ps table) from the host 2, the data stored in the pSLC region can be set, and the data having a high reading frequency can be read at a higher speed.

According to an HPB function, when the read request from the host 2 is received, the memory controller 3 uses the received L2Ps table to identify the physical block address PBA corresponding to the logical block address LBA related to the read request. Therefore, since the CPU 11 does not need to separately refer to the L2P table in the storage region 13b, the physical block address PBA corresponding to the logical block address LBA related to the read request can be identified more quickly.

Therefore, according to the third embodiment, the L2Ps table related to the data whose reading frequency is high by the host 2 can be obtained from the host 2, the L2Ps table can be searched, and the physical block address PBA can be acquired at a high speed. Further, since the memory controller 3 moves the data having a high reading frequency to the pSLC region based on the L2Ps table received from the host 2, the memory system 1A can read the data whose reading frequency is high at a high speed.

As described in the above embodiments, it is possible to provide a memory system in which the memory system autonomously moves the data whose reading frequency is high to a high-speed readable storage region.

Each of the above-described embodiments describes a case in which the memory cell array 4a of the NAND memory 4 of the non-volatile memory is a QLC type memory cell. However, the memory cell array 4a may be a TLC type memory cell or a multiple level cell (MLC) capable of storing 2-bit data.

In the above examples, a case in which in a QLC type non-volatile memory (capable of storing 4-bit data) was used as the slower storage region, and the high-speed readable storage region was the pSLC region (storing 1-bit data) was described. However, the high-speed readable storage region may be a MLC region storing data of less than 4-bit data. The high-speed readable storage region may also be a single level cell-type (SLC-type) region rather than a pseudo-single level cell-type region.

In some examples, the host 2 could select data to be read at a high speed and explicitly instruct placement of the data into the pSLC region. However, in such a case, it is necessary to perform driver development and program development on the host 2 side to identify and specify the data to be read at a high speed and then instruct placement of the identified data in the pSLC region. In addition, it would be necessary to consider memory allocation for each data type in advance, and when an unexpected operation occurs, there would be a possibility that an event in which the reading speed is significantly delayed may occur.

To avoid such problems, since according to the above-described embodiments, the memory system autonomously places the data having a high reading access frequency in the pSLC region based on the read requests from the host 2 or based on the information supplied by the host 2 in standard operations, there is no need to perform the driver development and installation on the host 2 side.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
a non-volatile memory array including a plurality of memory cells, each memory cell being a multilevel cell to which multibit data can be written, the non-volatile memory array including a first storage region in which the multibit data of a first bit level is written and a second storage region in which data of a second bit level less than the first bit level is written, the first and second storage regions each comprising multilevel cells that have the same storage capacity as one another; and
a memory controller configured to move pieces of data from the first storage region to the second storage region based on a portion of a logical-to-physical address conversion table received from an external host device that sends read requests to the memory controller.

2. The memory system according to claim 1, wherein the external information is received along with a read request from the external host device.

3. The memory system according to claim 1, wherein the memory controller is configured to provide a host performance booster function conforming to a universal flash storage (UFS) standard.

4. The memory system according to claim 1, wherein the second bit level is a 1-bit level.

5. The memory system according to claim 4, wherein the first bit level is a 4-bit level.

6. The memory system according to claim 1, wherein the non-volatile memory array is a NAND flash memory array.

* * * * *